US010494577B2

(12) United States Patent
Hanks

(10) Patent No.: US 10,494,577 B2
(45) Date of Patent: Dec. 3, 2019

(54) TRIM ALKALI METAL DESULFURIZATION OF REFINERY FRACTIONS

(71) Applicant: ExxonMobil Research and Engineering Company, Annandale, NJ (US)

(72) Inventor: Patrick L. Hanks, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 88 days.

(21) Appl. No.: 15/815,923

(22) Filed: Nov. 17, 2017

(65) Prior Publication Data

US 2018/0171238 A1 Jun. 21, 2018

Related U.S. Application Data

(60) Provisional application No. 62/435,891, filed on Dec. 19, 2016.

(51) Int. Cl.
| | | |
|---|---|---|
| *C10G 45/02* | (2006.01) | |
| *C10G 45/04* | (2006.01) | |
| *C10G 65/00* | (2006.01) | |
| *C10G 45/06* | (2006.01) | |
| *C10G 55/02* | (2006.01) | |
| *C10G 7/06* | (2006.01) | |
| *C10G 7/04* | (2006.01) | |
| *B01D 3/14* | (2006.01) | |
| *C01B 17/28* | (2006.01) | |
| *C10G 65/04* | (2006.01) | |
| *C10G 69/06* | (2006.01) | |
| *C10G 9/36* | (2006.01) | |

(52) U.S. Cl.
CPC ............ *C10G 45/06* (2013.01); *B01D 3/14* (2013.01); *C01B 17/28* (2013.01); *C10G 7/04* (2013.01); *C10G 7/06* (2013.01); *C10G 9/36* (2013.01); *C10G 45/02* (2013.01); *C10G 45/04* (2013.01); *C10G 55/02* (2013.01); *C10G 65/04* (2013.01); *C10G 69/06* (2013.01); *C10G 2300/1096* (2013.01); *C10G 2300/202* (2013.01); *C10G 2300/207* (2013.01); *C10G 2300/308* (2013.01); *C10G 2400/04* (2013.01)

(58) Field of Classification Search
CPC ........ C10G 45/02; C10G 45/04; C10G 65/00; C10G 2300/202
See application file for complete search history.

(56) References Cited

U.S. PATENT DOCUMENTS

| | | | |
|---|---|---|---|
| 3,369,992 A * | 2/1968 | Henke | ................... C10B 57/045 |
| | | | 208/131 |
| 3,600,298 A | 8/1971 | Mayumi | |
| 3,702,886 A | 11/1972 | Argauer et al. | |
| 3,709,979 A | 1/1973 | Chu | |
| 3,770,614 A | 11/1973 | Graven | |
| 3,788,978 A * | 1/1974 | Bearden, Jr. | ............. C01B 17/34 |
| | | | 208/208 M |
| 3,832,449 A | 8/1974 | Rosinski et al. | |
| 3,948,758 A | 4/1976 | Bonacci et al. | |
| 4,016,245 A | 4/1977 | Plank et al. | |
| 4,076,842 A | 2/1978 | Plank et al. | |
| 4,229,424 A | 10/1980 | Kokotailo | |
| 4,254,297 A | 3/1981 | Frenken et al. | |
| 4,310,440 A | 1/1982 | Wilson et al. | |
| 4,440,871 A | 4/1984 | Lok et al. | |
| 4,500,651 A | 2/1985 | Lok et al. | |
| 2013/0161234 A1* | 6/2013 | Vann | ...................... C10G 53/12 |
| | | | 208/89 |
| 2014/0174980 A1 | 6/2014 | Brown et al. | |
| 2014/0197040 A1* | 7/2014 | Gordon | ..................... C25C 1/02 |
| | | | 205/702 |

FOREIGN PATENT DOCUMENTS

EP 0229295 A2 12/1986

OTHER PUBLICATIONS

The International Search Report and Written Opinion of PCT/US2017/062235 dated Feb. 9, 2018.

* cited by examiner

*Primary Examiner* — Randy Boyer
(74) *Attorney, Agent, or Firm* — Andrew T. Ward; Ryan L. Lobato

(57) ABSTRACT

Systems and methods are provided for upgrading aromatic refinery fractions by performing trim alkali metal desulfurization. The alkali metal desulfurization can be performed by mixing the aromatic refinery fraction with alkali metal in finely dispersed solid and/or molten form, such as molten sodium. The aromatic nature of the refinery fraction can potentially be beneficial for the desulfurization reaction mechanism. The aromatic refinery fractions can correspond to fractions that have been previously processed to remove metals. Because only trim desulfurization is being performed, the desulfurization can be performed under relatively mild alkali metal desulfurization conditions that result in a reduced or minimized amount of feed conversion.

11 Claims, 3 Drawing Sheets

TRIM ALKALI METAL DESULFURIZATION OF REFINERY FRACTIONS

CROSS-REFERENCE TO RELATED APPLICATIONS

This application claims the benefit of U.S. Provisional Application No. 62/435,891, filed on Dec. 19, 2016, the entire contents of which are incorporated herein by reference.

FIELD

Systems and methods are provided for desulfurization of various refinery fractions using molten alkali metals.

BACKGROUND

Some of the challenges in processing whole or partial crudes can be related to the balance between the cost of upgrading certain types of fractions and the resources available on-site at a refinery. For example, many types of upgrading processes involve consumption of hydrogen. Due to the limited number of sources of hydrogen available in a refinery, it is preferable to reduce or minimize the amount of hydrogen that is used for upgrading of low value streams to low value products. Processes such as fluid catalytic cracking (FCC) can partially mitigate this problem by providing a method for upgrading lower value heavy fractions to naphtha fractions suitable for use in a gasoline pool. However, FCC processes provide only a partial solution, as such processes also typically generate substantial amounts of heavier fractions that may not even have value as fuel oil without further processing.

One reason that a lower value fraction may appear to require processing in the presence of additional hydrogen is due to the sulfur content of a fraction. Hydroprocessing for sulfur removal can be effective for removal of substantially all of the sulfur in a given petroleum fraction. Unfortunately, the hydroprocessing catalysts and/or conditions that lead to sulfur removal can also typically lead to substantial saturation of aromatic rings within a fraction. Such aromatic saturation can increase the amount of hydrogen consumed during hydroprocessing by as much as an order of magnitude or more. Because of the limited nature of hydrogen availability in some refineries, the excess hydrogen required for hydroprocessing of highly aromatic fractions can make upgrading of such fractions undesirable.

U.S. Pat. No. 3,788,978 describes methods for desulfurization of heavy hydrocarbon fractions using molten sodium. The methods are described as being suitable for performing substantial conversion of the heavy hydrocarbon feed, including conversion of substantially all asphaltenes within a heavy hydrocarbon feed, as well as removing 90 wt % of the sulfur in the heavy hydrocarbon feeds. The described levels of feed conversion and desulfurization are enabled by performing the molten sodium desulfurization at a temperature of 750° F. (399° C.) or more. The molten sodium desulfurization may be performed after an initial hydroprocessing step for removal of sulfur.

SUMMARY

In various aspects, a method for desulfurizing a feedstock is provided. The method can include exposing a feedstock to conversion conditions to form a conversion effluent. The conversion conditions can correspond to a variety of types of conversion reactions, such as conversion by fluid catalytic cracking, conversion by steam cracking, or conversion by hydroprocessing. After forming the conversion effluent, the conversion effluent can be separated to form at least a first converted fraction. The first converted fraction can comprise at least 30 wt % aromatics and/or a sulfur content of 0.5 wt % to 3.5 wt % and/or a content of Ni, V, and Fe of 10 wppm or less and/or a T5 distillation point of at least 230° C. At least a portion of the first converted fraction can be contacted with alkali metal in the presence of $H_2$-containing gas to form a converted mixture comprising alkali metal salt, such as a sulfur-containing alkali metal salt. The converted mixture can optionally comprise a molar ratio of alkali metal to sulfur of 0.5 to 5.0. The converted mixture can be separated to form a desulfurized converted fraction comprising a sulfur content of 0.05 wt % to 0.5 wt % and at least one alkali metal salt-containing fraction comprising at least 30 mol % of the alkali metal in the converted mixture. At least a portion of the alkali metal in the alkali metal salt-containing fraction can then be regenerated to elemental alkali metal, and the regenerated metal can optionally be recycled for further use in desulfurization. An example of a suitable alkali metal is sodium. Optionally, the $H_2$-containing treat gas rate can be provided at a $H_2$ treat gas rate of about 15 $Nm^3/m^3$ to about 200 $Nm^3/m^3$.

In some aspects, contacting the first converted fraction with alkali metal can correspond to converting less than 30 wt % of the first converted fraction relative to a conversion temperature of 566° C. and/or converting less than 10 wt % of the first converted fraction relative to a conversion temperature of 370° C.

In some aspects, the feedstock to the initial conversion process can include at least 10 wppm of Ni, V, and Fe. Optionally, the converted mixture can comprise a molar ratio of alkali metal to sulfur of 0.5 to 2.0. Optionally, the desulfurized converted fraction can comprise a sulfur content of 0.1 wt % to 0.5 wt %, or 0.05 wt % to 0.1 wt %.

In some aspects, the conversion effluent can comprise a steam cracker tar, a steam cracker gas oil, or a combination thereof. In such aspects, the conversion effluent can comprise an API gravity of 5 or less, a hydrogen content of 8.0 wt % or less, or a combination thereof. In other aspects, the conversion effluent can comprise a light cycle oil, a heavy cycle oil, a catalytic slurry oil, or a combination thereof. In such aspects, at least a portion of the desulfurized converted fraction is hydrotreated to form a hydrotreated effluent comprising a diesel boiling range fraction having a sulfur content of 50 wppm or less. In still other aspects, the conversion effluent can comprise a hydroprocessed effluent. In such aspects, the conversion conditions can comprise hydrotreating conditions and/or demetallization conditions. The hydrotreating and/or demetallization can be performed in the presence of at least one catalyst having a median pore diameter of at least 100 Angstroms. Optionally, the hydrotreating conditions can comprise conditions effective for conversion of at least 50 wt % of the feedstock relative to 370° C. Optionally, the contacting at least a portion of the first converted fraction with alkali metal to form a converted mixture comprising alkali metal salt can be performed during the separating the conversion effluent to form the first converted fraction.

In some aspects, the desulfurized converted fraction can comprises an API gravity at least 2 greater than an API gravity of the conversion effluent and/or a hydrogen content at least 0.2 wt % greater than a hydrogen content of the conversion effluent.

In some aspects, regenerating at least a portion of the alkali metal in the alkali metal salt-containing fraction can include: exposing at least one of the converted mixture and the at least one alkali metal salt-containing fraction to $H_2S$ to convert at least a portion of alkali metal compounds to alkali metal hydrosulfide; converting at least a portion of the alkali metal hydrosulfide to alkali metal polysulfide having a first stoichiometry by mixing the alkali metal hydrosulfide with alkali metal polysulfide having a second stoichiometry; performing electrolysis on the alkali metal polysulfide having the first stoichiometry in the presence of a membrane to form modified alkali metal polysulfide having a third stoichiometry and a membrane permeate comprising alkali metal; and heating at least a portion of the modified alkali metal polysulfide having the third stoichiometry to form sulfur and alkali metal polysulfide having the second stoichiometry, wherein the membrane optionally comprises a NASICON membrane.

In various aspects, a system for desulfurization of a conversion effluent is provided. The system can include a conversion reactor comprising a reactor inlet and a reactor outlet. The system can further include a first gas-liquid separator comprising a first separator inlet in fluid communication with the reactor outlet, a first separator outlet, and an alkali metal inlet in fluid communication with a source of alkali metal. The system can further include a second gas-liquid separator comprising a second separator inlet in fluid communication with the first separator outlet, and a second separator outlet. The system can further include a condensed phase separator comprising a condensed phase inlet in fluid communication with the second separator outlet, a first condensed phase outlet, and a second condensed phase outlet. The system can further include an alkali metal regeneration stage comprising an alkali metal transport membrane, the alkali metal regeneration stage comprising a regeneration stage inlet in fluid communication with the second condensed phase outlet, a permeate outlet, and a retentate outlet. Optionally, the alkali metal transport membrane can correspond to a NASICON membrane In some aspects, the alkali metal inlet can be in fluid communication with the permeate outlet and/or the first separator inlet can be in direct fluid communication with the reactor outlet and/or the second separator inlet can be in direct fluid communication with the first separator outlet.

DETAILED DESCRIPTION

Figure 1:
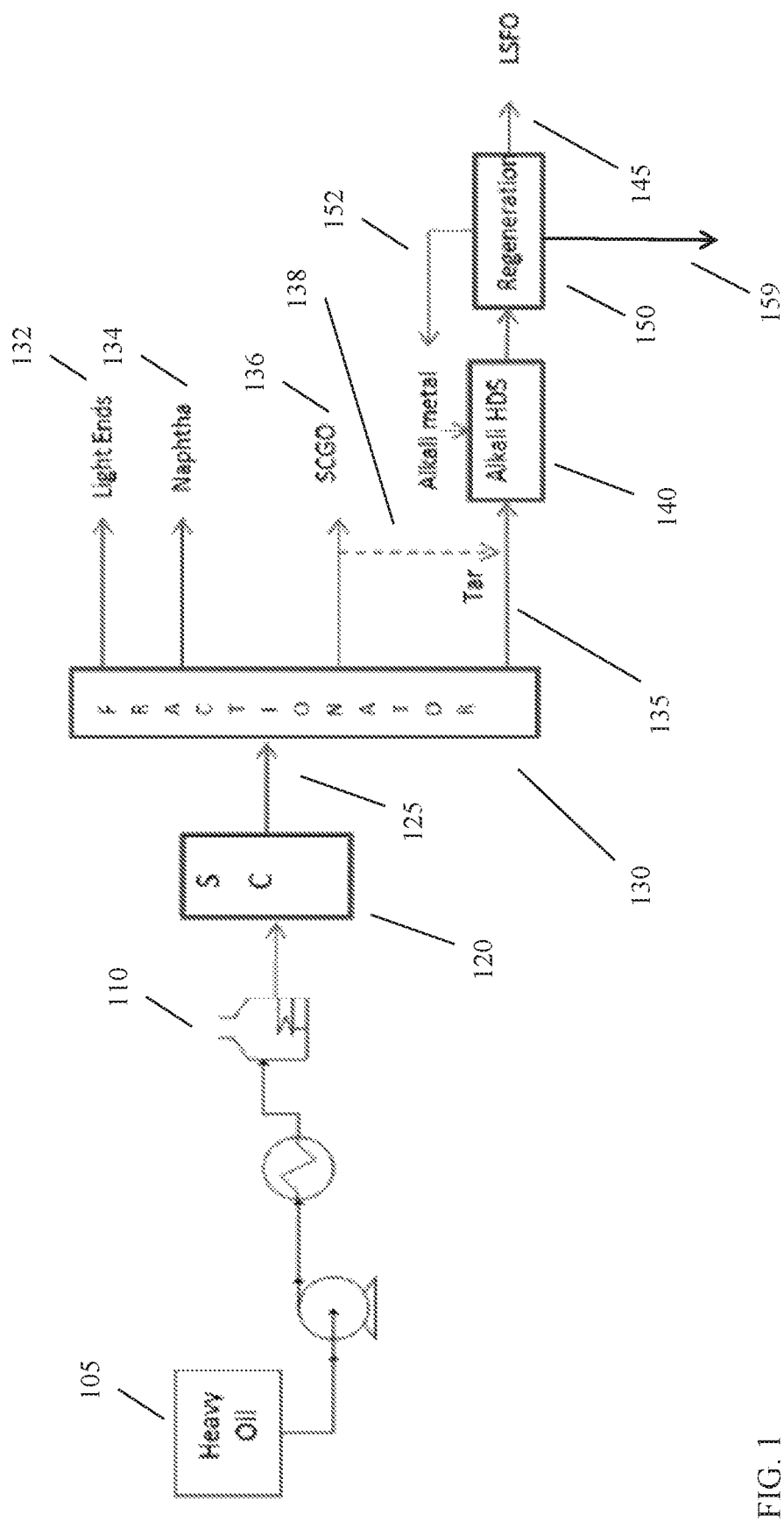
FIG. 1 shows an example of a reaction system for performing trim desulfurization on a converted feed derived from a steam cracking process.

In various aspects, systems and methods are provided for upgrading aromatic refinery fractions by performing trim alkali metal desulfurization. The alkali metal desulfurization can be performed by mixing the aromatic refinery fraction with alkali metal in finely dispersed solid and/or molten form, such as molten sodium. The aromatic nature of the refinery fraction can potentially be beneficial for the desulfurization reaction mechanism. The aromatic refinery fractions can correspond to fractions that have been previously processed to remove metals. The trim desulfurization conditions can be suitable for reducing the sulfur content of the refinery fraction to about 0.05 wt % to about 1.0 wt %, or about 0.05 wt % to about 0.5 wt %, or about 0.1 wt % to about 1.0 wt %, or about 0.1 wt % to about 0.5 wt %. Because only trim desulfurization is being performed, the desulfurization can be performed under relatively mild alkali metal desulfurization conditions that result in a reduced or minimized amount of feed conversion. As a result, the amount of conversion relative to 370° C. can be about 10 wt % or less, or about 5 wt % or less. Additionally or alternately, the amount of conversion relative to 566° C. can be about 30 wt % or less, or about 20 wt % or less.

A variety of refinery processes can generate suitable aromatic fractions for alkali metal desulfurization. Examples of suitable refinery fractions can include, but are not limited to, steam cracker gas oil and/or tar, cycle oils from fluid catalytic cracking, and partially hydrotreated resid fractions. These types of refinery fractions can have aromatic contents of 30 wt % to 80 wt %, or 40 wt % to 80 wt %, or 40 wt % to 70 wt %. In each of these types of prior processes, transition metals present within an input feedstock to the prior process can be reduced to a minimal level under typical operating conditions. By removing transition metals such as Ni, V, and/or Fe in a prior process, concerns related to contamination of sulfur with transition metals can be reduced or minimized. In particular, reducing or minimizing the concentration of transition metals can mitigate problems associated with transition metals plating on the sodium separation membrane during electrolysis for sodium regeneration.

In various aspects, a reaction scheme for using alkali metal for sulfur removal can include a regeneration or recovery process, so that alkali metal can be recycled for further sulfur removal. This can reduce or minimize the amount of alkali metal that is consumed by the sulfur removal process. An example of an overall reaction scheme for performing desulfurization using alkali metal can involve the following types of processes.

First, a desulfurization reaction can be performed, where alkali metal is contacted with a feed that includes organic sulfur-containing compounds. Such compounds are represented here as "R'SR". In this example, sodium is used as the alkali metal. When the feed is contacted with sodium in the presence of hydrogen, conversion of sulfur to sodium sulfide can occur according to Equation (1).

$$R'SR + 2Na^0 + H_2 \rightarrow RH + R'H + Na_2S \quad (1)$$

After contacting the feed with sodium, the sodium sulfide can be converted to molten sodium hydrosulfide to allow for phase separation of the sodium hydrosulfide from the remaining portion of the feed. This can be performed, for example, by introducing $H_2S$ into the mixture of feed and sodium sulfide to cause the reaction shown in Equation (2).

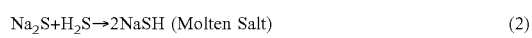

$$Na_2S + H_2S \rightarrow 2NaSH \text{ (Molten Salt)} \quad (2)$$

Up to this point, the net reaction corresponds to removal of a sulfur atom from the organic feed by combining the sulfur atom with two sodium atoms and one $H_2S$ molecule to generate (molten) sodium hydrosulfide. The sodium hydrosulfide can be readily separated from the feed due to the formation of a distinct phase. After separation, the sodium hydrosulfide can then be further processed, in part using an electrolytic cell, to regenerate the sodium and $H_2S$. The extracted sulfur atom can then be handled in any convenient manner. In order to prepare the sodium hydrosulfide for the electrolytic cell, the sodium hydrosulfide can be mixed with a sodium polysulfide. In this example, a stoichiometry of $Na_2S_{4.75}$ is used for the initial sodium polysulfide, but other choices of alkali metal polysulfide stoichiometry can be used, depending on the exact nature of the process and/or process conditions. An example of the reaction with the sodium polysulfide is shown in Equation (3).

$$2NaSH + 4Na_2S_{4.75} \rightarrow 5Na_2S_4 + H_2S \quad (3)$$

Reaction with the sodium polysulfide results in regeneration of the $H_2S$. The sodium used to initially extract the sulfur from the feed can then be regenerated by electrolysis, as shown in Equation (4).

$$5Na_2S_4 \rightarrow 2Na^0 + 4Na_2S_5 \quad (4)$$

Finally, the sulfur extracted from the feed can be recovered by returning the polysulfide to its original stoichiometry, such as via a thermal process. This is shown in Equation (5).

$$4Na_2S_5 + heat \rightarrow 4Na_2S_{4.75} + S \quad (5)$$

As shown above, the processes illustrated in Equations (1)-(5) (or other similar types of processes) provide a method for removing sulfur from a feed without net consumption of sodium. Hydrogen consumption is also reduced or minimized, as the above pathway for sulfur removal does not lead to substantial saturation of aromatic rings, as would be expected from conventional hydroprocessing. Additional details regarding process conditions and corresponding reaction systems are provided below.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, or Fe).

In some aspects, reference may be made to conversion of a feedstock relative to a conversion temperature. Conversion relative to a temperature can be defined based on the portion of the feedstock that boils at greater than the conversion temperature. The amount of conversion during a process (or optionally across multiple processes) can correspond to the weight percentage of the feedstock converted from boiling above the conversion temperature to boiling below the conversion temperature. As an illustrative hypothetical example, consider a feedstock that includes 40 wt % of components that boil at 700° F. (~371° C.) or greater. By definition, the remaining 60 wt % of the feedstock boils at less than 700° F. (~371° C.). For such a feedstock, the amount of conversion relative to a conversion temperature of ~371° C. would be based only on the 40 wt % that initially boils at ~371° C. or greater. If such a feedstock could be exposed to a process with 30% conversion relative to a ~371° C. conversion temperature, the resulting product would include 72 wt % of ~371° C.− components and 28 wt % of ~371° C.+ components.

In various aspects, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least ~90 wt % of the fraction, or at least ~95 wt % of the fraction. For example, for many types of naphtha fractions, at least ~90 wt % of the fraction, or at least ~95 wt %, can have a boiling point in the range of ~85° F. (~29° C.) to ~350° F. (~177° C.). For some heavier naphtha fractions, at least ~90 wt % of the fraction, and preferably at least ~95 wt %, can have a boiling point in the range of ~85° F. (~29° C.) to ~400° F. (~204° C.). For a kerosene fraction, at least ~90 wt % of the fraction, or at least ~95 wt %, can have a boiling point in the range of ~300° F. (~149° C.) to ~600° F. (~288° C.). For a kerosene fraction targeted for some uses, such as jet fuel production, at least ~90 wt % of the fraction, or at least ~95 wt %, can have a boiling point in the range of ~300° F. (~149° C.) to ~550° F. (~288° C.). For a diesel fraction, at least ~90 wt % of the fraction, and preferably at least ~95 wt %, can have a boiling point in the range of ~400° F. (~204° C.) to ~750° F. (~399° C.). For a (vacuum) gas oil fraction, at least ~90 wt % of the fraction, and preferably at least ~95 wt %, can have a boiling point in the range of ~650° F. (~343° C.) to ~1100° F. (~593° C.). Optionally, for some gas oil fractions, a narrower boiling range may be desirable. For such gas oil fractions, at least ~90 wt % of the fraction, or at least ~95 wt %, can have a boiling point in the range of ~650° F. (~343° C.) to ~1000° F. (~538° C.), or ~650° F. (~343° C.) to ~900° F. (~482° C.). A residual fuel product can have a boiling range that may vary and/or overlap with one or more of the above boiling ranges. Suitable techniques for determining boiling points (including fractional weight distillation points) can include ASTM D2887 and ASTM D7169. A residual marine fuel product can satisfy the requirements specified in ISO 8217, Table 2.

In this discussion, a low sulfur fuel oil can correspond to a fuel oil containing about 0.5 wt % or less of sulfur. An ultra low sulfur fuel oil, which can also be referred to as an Emission Control Area fuel, can correspond to a fuel oil containing about 0.1 wt % or less of sulfur. A low sulfur diesel can correspond to a diesel fuel containing about 500 wppm or less of sulfur. An ultra low sulfur diesel can correspond to a diesel fuel containing about 15 wppm or less of sulfur, or about 10 wppm or less.

Trim Desulfurization Using Molten Alkali Metal

In various aspects, processes described herein can involve contacting a sulfur-containing petroleum oil stock with a desulfurization agent comprising an alkali metal, such as lithium, sodium, potassium, and the like, preferably sodium, at desulfurization conditions, thereby forming a mixture comprising an oil of diminished sulfur content containing alkali metal salts.

The alkali metal salts comprise in addition to alkali metal sulfide, by-product alkali metal salts such as organo metal salts, metal oxides, mercaptides, amides and the like. For ease of understanding, the following description will focus on describing sulfur removal processes that involve sodium as an alkali metal, although it is understood that other alkali metals may be used.

The alkali metal desulfurizing agent may be an alkali metal such as sodium, potassium, lithium, rubidium, and/or cesium. Contacting of the alkali metal and sulfur-containing feedstock is carried out at elevated temperatures and in the presence of added hydrogen in order that combined hydrodesulfurization and hydroconversion of the heavier feed components is obtained. In various aspects, the temperature for contacting a feed with an alkali metal can be about 150° C. to about 400° C., or about 150° C. to about 300° C., or about 150° C. to about 250° C., or about 150° C. to about 230° C., or about 150° C. to about 200° C., or about 200° C. to about 400° C., or about 200° C. to about 300° C. The temperature can be dependent on various factors, such as the temperature of the primary fractionator used for generation of the feed fraction that is delivered to the alkali metal desulfurization process. In aspects where the trim desulfurization is performed on a fraction including steam cracker tar, temperatures of greater than about 230° C., or greater than about 250° C., can be less desirable so that growth of asphaltenes can be reduced or minimized.

Sufficient hydrogen can be added to the reaction environment to maintain a hydrogen partial pressure of between about 50 psig (~340 kPag) and 400 psig (~2800 kPag) in the conversion zone, or between about 100 psig (~690 kPag) and 400 psig (~2800 kPag). In this manner, the bulk of the reactants within the reaction zone are maintained in a liquid phase, and the alkali metal is in a molten state. The treat gas rate to the reaction environment can correspond to an $H_2$ treat gas rate of about 15 $Nm^3/m^3$ to about 200 $Nm^3/m^3$, or about 25 $Nm^3/m^3$ to about 150 $Nm^3/m^3$, or about 30 $Nm^3/m^3$ to about 120 $Nm^3/m^3$. In aspects where the treat gas includes components other than $H_2$, the total treat gas rate can be correspondingly higher. The alkali metal, such as sodium, reacts with the sulfur-containing oil in a manner to yield sodium sulfide, which generally forms as a micro-crystalline dispersion in the oil. The amount of alkali metal introduced into the reaction environment can correspond to a molar ratio of alkali metal to sulfur of about 0.5 to about 5.0, or about 0.5 to about 3.0, or about 0.5 to about 2.0. The latter range of molar ratio values can be appropriate for aspects where trim desulfurization is used to produce a desulfurized product having a sulfur content of about 0.5 wt % to about 1.0 wt %. The reaction between sodium and sulfur-containing oil can generally correspond to the reaction shown in Equation (1).

The prior conversion process for removing transition metals from a feed for trim alkali metal desulfurization can often also be suitable for removing sodium chloride. However, in some aspects it may be desirable to desalt a feed (either prior to trim desulfurization and/or prior to the prior conversion process) in order to prevent NaCl contamination of the molten polysulfide feed to the electrolysis cell. Desalting is a well-established process in the industry. An example of a suitable desalting process involves the addition of a small amount of water to the oil in order to dissolve the salt contained therein, followed by electrical coalescers. The oil is then dehydrated by conventional means known in the industry.

The desulfurization step can be conducted as a batch or continuous type operation but is preferably continuous. The desulfurization can be performed in any convenient type of reaction vessel (or combination of reaction vessels) that provide suitable mixing of the oil and alkali metal. Some examples of suitable reaction vessel(s) can correspond to a single reactor or multiple reactors equipped with (a) shed rows or other stationary devices to encourage contacting; (b) orifice mixers; (c) efficient stirring devices such as mechanical agitators, jets of restricted internal diameter, turbomixers and the like, or (d) a packed bed. As another example, the sequence of separation vessels used after hydrotreatment of a feed can be suitable for mixing the feed and the alkali metal. For example, alkali metal can be introduced into a high pressure, high temperature separation device located after a hydroprocessing reactor for separation of gaseous components from the liquid effluent. The liquid effluent from the high pressure, high temperature separator can then be passed through a valve into a low pressure, high temperature separator for further separation of gas components from liquid effluent. Passing the mixture of liquid effluent and sodium through the let-down valve between the high pressure and low pressure separators can facilitate mixing of the feed and alkali metal. The petroleum oil stock and the sodium metal or sodium metal alloy can be passed through one or more reactors in concurrent, crosscurrent, or countercurrent flow, etc. It can be beneficial to exclude oxygen and water from the reaction zones. However, it is understood that trace amounts of water, i.e., less than about 0.5 weight percent, preferably less than about 0.1 weight percent based on total feed, can be present in the reactor. Where there are larger amounts of water, process efficiency may be lowered somewhat as a consequence of sodium reacting with the water.

The oil dispersion containing alkali metal sulfide (and optionally other alkali metal salts) can then be contacted with hydrogen sulfide in amounts ranging from about 100 to 400 mole percent, or 110 to 200 mole percent, based upon the total number of moles of salt present in the mixture. This can convert sodium salts in the dispersion (optionally including by-product salts such as sodium oxide and/or sodium hydroxide) to sodium hydrosulfide. This can correspond to the reaction shown in Equation (2) above. At the contacting temperatures described herein, the sodium hydrosulfide can correspond to a molten sodium hydrosulfide phase that can be readily separated from the feed. Alternatively, at lower temperatures the addition of $H_2S$ can lead to formation of a macrocrystalline salt phase that can be separated from the oil phase and recovered employing one of several well-known commercial techniques, notably filtration or centrifugation. The $H_2S$-treated mixture of salts can then be treated in various ways in order to regenerate alkali metal therefrom.

In various aspects, a separation can be performed to separate the desulfurized hydrocarbon product from a salt phase that contains at least 30 mol % of the sodium (or other alkali metal) in the mixture, or at least 50 mol %, or at least 70 mol %, or at least 90 mol %. After separation, the salt phase (corresponding at least in part to sodium hydrosulfide) can be contacted with a sulfur-rich sodium polysulfide, desirably in the molten state and preferably represented by the formula, $Na_2S_x$ (where x varies from about 4.0 to 4.9, preferably from about 4.4 to 4.8). The contacting results in the formation of a sulfur-depleted sodium polysulfide, (i.e., $Na_2S_y$ (where y ranges from about 2.8 to 4.5, preferably from about 3.5 to 4.3), desirably at a temperature above the melting point of the resulting polysulfide. Equation (3) above is an example of this type of reaction to convert $Na_2S_x$ to $Na_2S_y$. As shown in Equation (3), this process can also liberate the hydrogen sulfide used in the reaction shown in Equation (2). Optionally, the liberated hydrogen sulfide can be recovered, purified to remove traces of water and recycled in the process.

After optional further treatment of the $Na_2S_y$ to remove various impurities present therein, the $Na_2S_y$ is cycled to electrolytic cells wherein it is dissociated to form molten sodium and a sulfur-rich sodium polysulfide, i.e., $Na_2S_z$ wherein z ranges from about 4.5 to about 5.0. This can correspond to a process similar to the process represented by Equation (4) above. The sodium thereby formed is then withdrawn and can be, for example, recycled into the desulfurization zone.

In some aspects, the electrolytic cell unit can comprise a sodium ion-conducting physical and electronic barrier or membrane that separates alkali metal on the one side from alkali metal polysulfide on the other side. Generally, the membrane may be composed of any material that can function as a sodium ion-conducting separator, such as beta-alumina containing sodium oxide. For a beta-alumina type membrane, the beta-alumina can contain sodium oxide in the general range of about $Na_2O:11Al_2O_3$—$Na_2O:5Al_2O_3$. It is noted that when an alkali metal other than sodium is employed in the instant process, the oxide of the alkali metal will be admixed with the beta-alumina in lieu of $Na_2O$. The beta-alumina may be used in the pure form or doped with a small amount of metal oxide such as MgO, $Li_2O$ and the like. During cell operation, sodium ions migrate from the sodium polysulfide side, i.e., the anode side, through the barrier to the sodium metal side, i.e., the cathode side, where they are neutralized by electrons. At the same time polysulfide ions can give up their electrons at the electron-conducting anode to form elemental sulfur that then reacts with additional polysulfide anions to form new polysulfide ions of greater sulfur content.

As an alternative to a beta-alumina membrane, another option for a membrane can be to use a sodium super ion conductor (or another alkali metal super ion conductor). A sodium super ion conductor material can also be referred to as a NASICON material. The stoichiometry for a NASICON compound can be $Na_{1+x}Zr_2P_{3-x}Si_xO_{12}$, wherein $0 \leq x \leq 3$. NASICON materials are a class of structurally isomorphous 3-D framework compounds possessing high conductivity that can potentially be comparable to the conductivity of a liquid electrolyte at higher temperatures. The high ionic conductivity of a NASICON material can allow a membrane made from a NASICON material to be suitable for transport of sodium during recovery of sodium from sodium polysulfide by electrolysis.

The anode may comprise any suitable electron conducting-current collector such as graphite, molybdenum, titanium, chromium, stainless steel, or aluminum that can withstand corrosive attack of the sodium polysulfide. In some aspects, the cells can be arranged in series electrically, so that the anode for one cell is the cathode for the one adjacent to it.

During electrolysis the high sulfur polysulfide anions ($Na_2S_z$) generated during electrolysis can be continually removed from the cell. The recovered $Na_2S_z$ can be reduced in sulfur content to $Na_2S_x$ by application of a vacuum and/or heat thereby liberating sulfur corresponding to that which was removed from the oil. This process can correspond to the reaction shown in Equation (5) above. The resulting $Na_2S_x$ can then be used, for example, in another cycle of the sodium recovery process.

In other alternative embodiments, other options can be available for removal and/or recycle of sulfur and/or sodium. For example, one alternative can be to allow elemental sulfur to build up in the cell while maintaining a sufficient operating temperature therein so that the sulfur is continuously removed therefrom as vapor. In still another alternative, liquid sulfur can form in the cell and can then be separated from the polysulfide outside the cell.

While NASICON and beta-alumina type cells have been described, any other cell that is capable of economically decomposing sodium polysulfide into molten sodium is sufficient for the present purposes.

Configuration Example-Upgrading of Steam Cracker Product Fractions

Steam cracker tar and/or gas oil fractions are examples of suitable feeds for trim desulfurization using alkali metal. Steam cracking (i.e., processing in a steam cracker) provides an example of a suitable prior process that can remove transition metals from a feed prior to the trim desulfurization.

Heavy feed steam crackers combine crude oil, or a heavy cut thereof (such as atmospheric distillation tower bottoms), with steam to facilitate the separation of lighter hydrocarbon molecules from the heavier hydrocarbon molecules in the heavy feed. The mixed feed is then fed to a vapor-liquid separator drum, sometimes referred to as a Koln pot or a K-Pot. The heavier product, corresponding to the Koln pot bottoms, can be separated from the volatile hydrocarbons and steam. Some heavy feed crackers obtain heavy liquid feeds that have been previously processed in non-integrated facilities to improve feed properties such as hydrogen or sulfur content. It is noted that transition metals within a feed will typically not volatilize in a Koln pot, so that the Koln pot bottoms contains a substantial majority of the metals within the initial steam cracker feed.

The volatile hydrocarbons from the Koln pot and steam are then fed through heating coils in a furnace and then are fed to a heavy feed cracker. A portion of the volatile hydrocarbon molecules are cracked into even lighter hydrocarbon molecules, such as $C_2$ and $C_3$ range molecules, depending on the feed, the steam to feed ratio, and the operating conditions of the heavy feed steam cracker. Heavier hydrocarbons are recovered from the heavy feed steam cracker as steam cracker tar. A distillate boiling range portion of the products from the steam cracker can correspond to steam cracker gas oil.

Conventionally, production of low sulfur steam cracker tar liquid products is determined by crude slate (i.e., using light sweet crudes) and/or through feed hydrotreating prior to steam cracking. Sulfur concentration in steam cracker products tends to increase with boiling point, with steam cracker gas oil (SCGO) and steam cracker tar (SCT) corresponding to the products with the highest sulfur content. For typical feeds, the sulfur content of SCGO and/or SCT can be greater than 0.5 wt %, or greater than 1.0 wt %, such as 2.0 wt % or more. As regulations related to sulfur content of fuel oil and/or marine fuel oil continue to be lowered, it can be desirable to provide a method for reducing the sulfur content of SCT and/or SCGO fractions to 1.0 wt % or less, or 0.5 wt % or less, such as possibly as low as 0.1 wt % or less.

SCT can have a relatively low hydrogen content compared to heavy oil fractions that are typically processed in a refinery setting. In some aspects, SCT can have a hydrogen content of about 8.0 wt % or less, about 7.5 wt % or less, or about 7.0 wt % or less, or about 6.5 wt % or less. In particular, SCT can have a hydrogen content of about 5.5 wt % to about 8.0 wt %, or about 6.0 wt % to about 7.5 wt %. Additionally or alternately, SCT can have a micro carbon residue (or alternatively Conradson Carbon Residue) of at least about 10 wt %, or at least about 15 wt %, or at least about 20 wt %, such as up to about 40 wt % or more.

SCT can also be highly aromatic in nature. The paraffin content of SCT can be about 2.0 wt % or less, or about 1.0 wt % or less, such as having substantially no paraffin content. The naphthene content of SCT can also be about 2.0 wt % or less or about 1.0 wt % or less, such as having substantially no naphthene content. In some aspects, the combined paraffin and naphthane content of SCT can be about 1.0 wt % or less. With regard to aromatics, at least about 30 wt % of SCT can correspond to 3-ring aromatics, or at least 40 wt %. In particular, the 3-ring aromatics content can be about 30 wt % to about 60 wt %, or about 40 wt % to about 55 wt %, or about 40 wt % to about 50 wt %. Additionally or alternately, at least about 30 wt % of SCT can correspond to 4-ring aromatics, or at least 40 wt %. In particular, the 4-ring aromatics content can be about 30 wt % to about 60 wt %, or about 40 wt % to about 55 wt %, or about 40 wt % to about 50 wt %. Additionally or alternately, the 1-ring aromatic content can be about 15 wt % or less, or about 10 wt % or less, or about 5 wt % or less, such as down to about 0.1 wt %.

Due to the low hydrogen content and/or highly aromatic nature of SCT, the solubility number ($S_{BN}$) and insolubility number ($I_N$) of SCT can be relatively high. SCT can have a $S_{BN}$ of at least about 100, and in particular about 120 to about 230, or about 150 to about 230, or about 180 to about 220. Additionally or alternately, SCT can have an $I_N$ of about 70 to about 180, or about 100 to about 160, or about 80 to about 140. Further additionally or alternately, the difference between $S_{BN}$ and $I_N$ for the SCT can be at least about 30, or at least about 40, or at least about 50, such as up to about 150. Solubility number and insolubility number are defined, along with methods of calculation, by I. Wiehe and R. Kennedy, *Energy & Fuels,* 2000, 14, 56-59.

SCT can also have a higher density than many types of crude or refinery fractions. In various aspects, SCT can have a density at 15° C. of about 1.08 g/cm$^3$ to about 1.20 g/cm$^3$, or 1.10 g/cm$^3$ to 1.18 g/cm$^3$. By contrast, many types of vacuum resid fractions can have a density of about 1.05 g/cm$^3$ or less. Additionally or alternately, density (or weight per volume) of the heavy hydrocarbon can be determined according to ASTM D287-92 (2006) Standard Test Method for API Gravity of Crude Petroleum and Petroleum Products (Hydrometer Method), which characterizes density in terms of API gravity. In general, the higher the API gravity, the less dense the oil. API gravity can be 5° or less, or 0° or less, such as down to about −10° or lower.

Performing trim alkali metal desulfurization on a steam cracker tar fraction (or a mixture of SCT and SCGO) can potentially provide benefits related to the hydrogen content and/or the API gravity of the desulfurized product. In some aspects, a trim desulfurized product based on SCT (or a mixture of SCT and SGO) can have an API gravity that is at least 2 greater than the API gravity of the SCT feed to trim desulfurization, or at least 4 greater, such as up to 8 greater or more. Additionally or alternately, a trim desulfurized product based on SCT (or a mixture of SCT and SGO) can have an hydrogen content that is at 0.2 wt % greater than the hydrogen content of the SCT feed to trim desulfurization, or at least 0.5 wt % greater, such as up to 1.0 wt % greater or more.

It is noted that SCT fractions can often include coke and/or asphaltene fines. If desired, the fines in an SCT fraction can be removed by any convenient method prior to trim alkali metal desulfurization, such as by filtration. It is noted that the concern related to any fines in an SCT fraction would likely be due to equipment fouling, as opposed to plating and/or coking of the membrane during sodium regeneration.

FIG. 1 shows an example of a configuration for performing trim desulfurization on SCT and/or SCGO fractions using alkali metal. In FIG. 1, a feed 105 can correspond to the lower boiling portion of a heavy oil fraction after passing the heavy oil fraction through a Koln pot or other separator. For example, feed 105 can correspond to roughly the 950° F.− (510° C.−) portion of a heavy oil feed, based on separation in a Koln pot or other type of separator. The bottoms from the Koln pot can be processed separately. Optionally, steam can already be mixed with feed 105 at this stage, or steam can be subsequently added (not shown). The feed 105 can be heated in a heater or furnace 110 prior to passing the feed into steam cracker 120. Inside steam cracker 120, the heated feed can be passed through a hank of convective heating coils and then fed to a radiant heating section. In the radiant heating section, the feed is thermally cracked to yield a cracked product stream 125. The specific composition a the cracked product stream 125 may, among other factors, depend on the composition of the feed, the ratio of steam to hydrocarbons in die steam cracker 120, and/or the operating conditions of the steam cracker 120.

The cracked product stream 125 from steam cracker 120 can be fractionated in a fractionator 130 to form a plurality of products. Although a single fractionator 130 is shown, it is understood that fractionator 130 can alternatively correspond to a plurality of fractionation/separation stages for performing a fractionation. The products from fractionator 130 can include, for example, one or more light ends fractions 132, one or more naphtha boiling range fractions 134, one or more gas oil boiling range fractions 136 (SCGO), and a bottoms or tar fraction 135 (SCT). The light ends fraction(s) 132 can include one or more fractions corresponding to $C_2$ and/or $C_3$ products, such as olefin products.

In the configuration shown in FIG. 1, trim alkali metal desulfurization is performed on tar fraction 135. Optionally, a portion 138 of gas oil boiling range fraction(s) 136 can be included with tar fraction 135 for processing by trim alkali metal desulfurization. The tar fraction 135 (optionally including portion 138 of gas oil boiling range fraction 136) can be passed into a desulfurization reactor 140 for contact with alkali metal, such as sodium. The alkali metal can be provided to desulfurization reactor 140 in part as a recycle stream 152 of recycled alkali metal. In the configuration shown in FIG. 1, the desulfurization reactor 140 can schematically represent both the contacting of the tar fraction 135 with alkali metal and the subsequent exposure of the tar/alkali metal mixture to $H_2S$ to form alkali metal hydrosulfides. The reaction products from desulfurization reactor 140 can then be passed into regeneration reactor 150 for contact with alkali metal polysulfides. This can allow for regeneration of sodium for recycle 152 while also providing a fuel oil product 155 with reduced sulfur content. The excess elemental sulfur 159 generated during the regeneration process can be handled in any convenient manner. The fuel oil product 155 can have a sulfur content of about 0.1 wt % to about 1.0 wt %, or about 0.1 wt % to about 0.5 wt %, or about 0.05 wt % (~500 wppm) to about 1.0 wt %, or about 0.05 wt % (~500 wppm) to about 0.5 wt %, or about 0.05 wt % to 0.1 wt %. In the claims below, sulfur content can be determined according to ASTM D2622.

Configuration Example-Upgrading of Fractions from Resid Hydrotreating

Fractions generated during hydroprocessing of vacuum resid fractions (and/or atmospheric resid fractions) can be examples of suitable feeds for trim desulfurization using alkali metal. Hydroprocessing, such as demetallization followed by hydrotreatment, provides an example of a suitable prior process that can remove transition metals from a feed prior to the trim desulfurization.

Conventionally, production of low sulfur fuel oil can be based on crude slate (light sweet crude) and/or processing the resid portion of a crude under high pressure, high temperature conditions. Due in part to difficulties with catalyst and equipment lifetime under typical resid hydroprocessing conditions, hydroprocessing of resid fractions can require significant capital and operating expenses while providing a relatively low value product (fuel oil). Additionally, part of the high operating cost for resid hydroprocessing can be related to the large amounts of hydrogen required to saturate aromatic rings prior to desulfurization of aromatic cores.

Alkali metal desulfurization can reduce or minimize these difficulties by providing a reaction pathway for desulfurization that does not require prior aromatic saturation. Instead, the high aromatic contents of typical resid fractions can be beneficial in facilitating the electron transfer mechanism involved in desulfurization using an alkali metal. By combining hydroprocessing with alkali metal desulfurization, a portion of the sulfur in a feed can be removed in an initial hydroprocessing stage (or stages). The hydroprocessing can include hydrotreatment of the feed by exposing the feed to a hydrotreatment catalyst under hydrotreatment conditions. The hydroprocessing can further include demetallization of a feed by exposure of the feed to a hydrotreating and/or demetallization catalyst prior to hydrotreating. Alternatively, removal of transition metals can be performed during the hydrotreatment process. Optionally, a heavy oil feed can be processed in the presence of a solvent and/or a co-feed.

The catalysts used for hydrotreatment of a heavy oil feed can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. It is within the scope of the invention that more than one type of hydroprocessing catalyst can be used in one or multiple reaction vessels.

The at least one Group VIII non-noble metal, in oxide form, can typically be present in an amount ranging from about 2 wt % to about 30 wt %, preferably from about 4 wt % to about 15 wt %. The at least one Group VI metal, in oxide form, can typically be present in an amount ranging from about 2 wt % to about 60 wt %, preferably from about 6 wt % to about 40 wt % or from about 10 wt % to about 30 wt %. These weight percents are based on the total weight of the catalyst. It is noted that under hydroprocessing conditions, the metals may be present as metal sulfides and/or may be converted metal sulfides prior to performing hydroprocessing on an intended feed.

A vessel or hydroprocessing zone in which catalytic activity occurs can include one or more hydroprocessing catalysts. Such catalysts can be mixed or stacked, with the catalyst optionally but preferably being in a fixed bed in the vessel or hydroprocessing zone. In such aspects, the fixed bed reactor can be operated under continuous-gas-phase conditions, such as trickle-bed conditions.

The support can be impregnated with the desired metals to form the hydroprocessing catalyst. In particular impregnation embodiments, the support is heat treated at temperatures in a range of from 400° C. to 1200° C. (752° F. to 2192° F.), or from 450° C. to 1000° C. (842° F. to 1832° F.), or from 600° C. to 900° C. (1112° F. to 1652° F.), prior to impregnation with the metals.

The process of this invention can be effectively carried out using a hydroprocessing catalyst having any median pore diameter effective for hydroprocessing the heavy oil component. For example, the median pore diameter can be in the range of from 30 to 1000 Å (Angstroms), or 50 to 500 Å, or 60 to 300 Å, or 50 Å to 200 Å, or 180 to 500 Å, or 200 to 300 Å. Pore diameter is preferably determined according to ASTM Method D4284-07 Mercury Porosimetry. In aspects where a separate demetallization catalyst is not present, the hydroprocessing catalyst can have a median pore diameter of at least 100 Å, or at least 200 Å.

In some aspects, the hydroprocessing catalyst can have a pore size distribution that is not so great as to negatively impact catalyst activity or selectivity. For example, the hydroprocessing catalyst can have a pore size distribution in which at least 60% of the pores have a pore diameter within 45 Å, 35 Å, or 25 Å of the median pore diameter. In certain embodiments, the catalyst has a median pore diameter in a range of from 50 to 180 Å, or from 60 to 150 Å, with at least 60% of the pores having a pore diameter within 45 Å, 35 Å, or 25 Å of the median pore diameter.

Pore volume should be sufficiently large to further contribute to catalyst activity or selectivity. For example, the hydroprocessing catalyst can have a pore volume of at least about 0.3 $cm^3/g$, or at least about 0.7 $cm^3/g$, or at least about 0.9 $cm^3/g$. In certain embodiments, pore volume can range from about 0.3 $cm^3/g$ to about 1.0 $cm^3/g$, about 0.4 $cm^3/g$ to about 0.8 $cm^3/g$, or about 0.5 $cm^3/g$ to about 0.7 $cm^3/g$.

In some aspects, a combination of catalysts can be used for hydroprocessing of a heavy oil feed. For example, a heavy oil feed can be contacted first by a demetallization catalyst, such as a catalyst including NiMo or CoMo on a support with a median pore diameter of 100 Å or greater, or 200 Å or greater. A demetallization catalyst represents a lower activity catalyst that is effective for removing at least a portion of the metals content of a feed. This allows a less expensive catalyst to be used to remove a portion of the metals, thus extending the lifetime of any subsequent higher activity catalysts. The demetallized effluent from the demetallization process can then be contacted with a hydroprocessing catalyst.

Contacting conditions in the contacting or hydroprocessing zone can include, but are not limited to, temperature, pressure, hydrogen flow, hydrocarbon feed flow, or combinations thereof. Contacting conditions in some embodiments are controlled to yield a product with specific properties. For example, the contacting conditions can be selected to remove at least 50 wt % of the sulfur in the feed from the hydrotreated hydrocarbon product, or at least 60 wt %, or at least 70 wt %, such as up to 75 wt % or more. The resulting hydrotreated hydrocarbon product and/or a bottoms fraction of the hydrotreated hydrocarbon product can have a sulfur content of about 1.0 wt % to about 3.5 wt %. With regard to metals, the hydrotreatment (and optional hydrodemetallization) conditions can be selected to remove at least 70 wt % of the Ni, V, and Fe in the feed, or at least 80 wt %, or at least 90 wt %. The transition metal content, or alternatively the combined Ni, V, and Fe content, of the bottoms fraction of the hydrotreated hydrocarbon product and/or the total hydrotreated hydrocarbon product can be about 10 wppm or less, or about 5 wppm or less, or about 3 wppm or less. In the claims below, the content of Ni, V, and Fe in a sample can be determined by ASTM D5708.

Because the hydroprocessing is carried out under lower pressure and/or lower temperature conditions than a typical process for resid hydroprocessing, the aromatics content of the total hydrocarbon product can be greater than a typical resid hydroprocessing effluent. In some aspects, the aromatics content of the hydroprocessed hydrocarbon product and/or a bottoms portion thereof can be about 30 wt % to about 60 wt %. In the claims below, aromatics content in a sample can be determined by ASTM D5292.

Hydroprocessing is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas, as referred to herein, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more preferably at least about 75 vol. % hydrogen.

Hydrogen can be supplied at a rate of from 300 SCF/B (standard cubic feet of hydrogen per barrel of feed) (53 S $m^3/m^3$) to 10000 SCF/B (1780 S $m^3/m^3$), or from 1000 SCF/B (178 S $m^3/m^3$) to 5000 SCF/B (891 S $m^3/m^3$). The temperature in the contacting zone can be about 300° C. to about 400° C., or about 300° C. to about 370° C., or about 320° C. to about 400° C., or about 320° C. to about 370° C. Liquid hourly space velocity (LHSV) of the feed can be from 0.1 to 5.0 $h^{-1}$, or 0.1 $h^{-1}$ to 2.0 $h^{-1}$, or 0.5 to 5.0 $h^{-1}$.

Total pressure in the contacting zone can range from 200 psig (1.4 MPa-g) to 1500 psig (10.3 MPa-g), or from 400 psig (2.8 MPa-g) to 1500 psig (10.3 MPa-g), or from 200 psig (1.4 MPa-g) to 1000 psig (6.9 MPa-g), or from 400 psig (2.8 MPa-g) to 1000 psig (6.9 MPa-g). Additionally or alternatively, the hydrogen partial pressure can be at least about 200 psig (1.4 MPa-g), or at least about 400 psig (2.8 MPa-g), or at least about 600 psig (4.1 MPa-g). Additionally or alternatively, the hydrogen partial pressure can be about 1000 psig (6.9 MPa-g) or less, such as about 900 psig (6.2 MPa-g) or less, or about 850 psig (5.9 MPa-g) or less, or about 800 psig (5.5 MPa-g) or less, or about 750 psig (5.2 MPa-g) or less. In such aspects with low hydrogen partial pressure, the total pressure in the reactor can be about 1200 psig (8.3 MPa-g) or less, and preferably 1000 psig (6.9 MPa-g) or less, such as about 900 psig (6.2 MPa-g) or less or about 800 psig (5.5 MPa-g) or less.

In some aspects, the entire effluent from resid hydroprocessing can be exposed to alkali metal for desulfurization. This can be accomplished, for example, by introducing sodium into a separation stage for separation of the effluent into liquid and gaseous products. The sodium sulfide phase formed by introducing sodium can be passed along in the separation stages with the bottoms portion from each stage until it is time for separation of the sodium-containing phase from the remaining portion of the hydrocarbon product.

Figure 2:
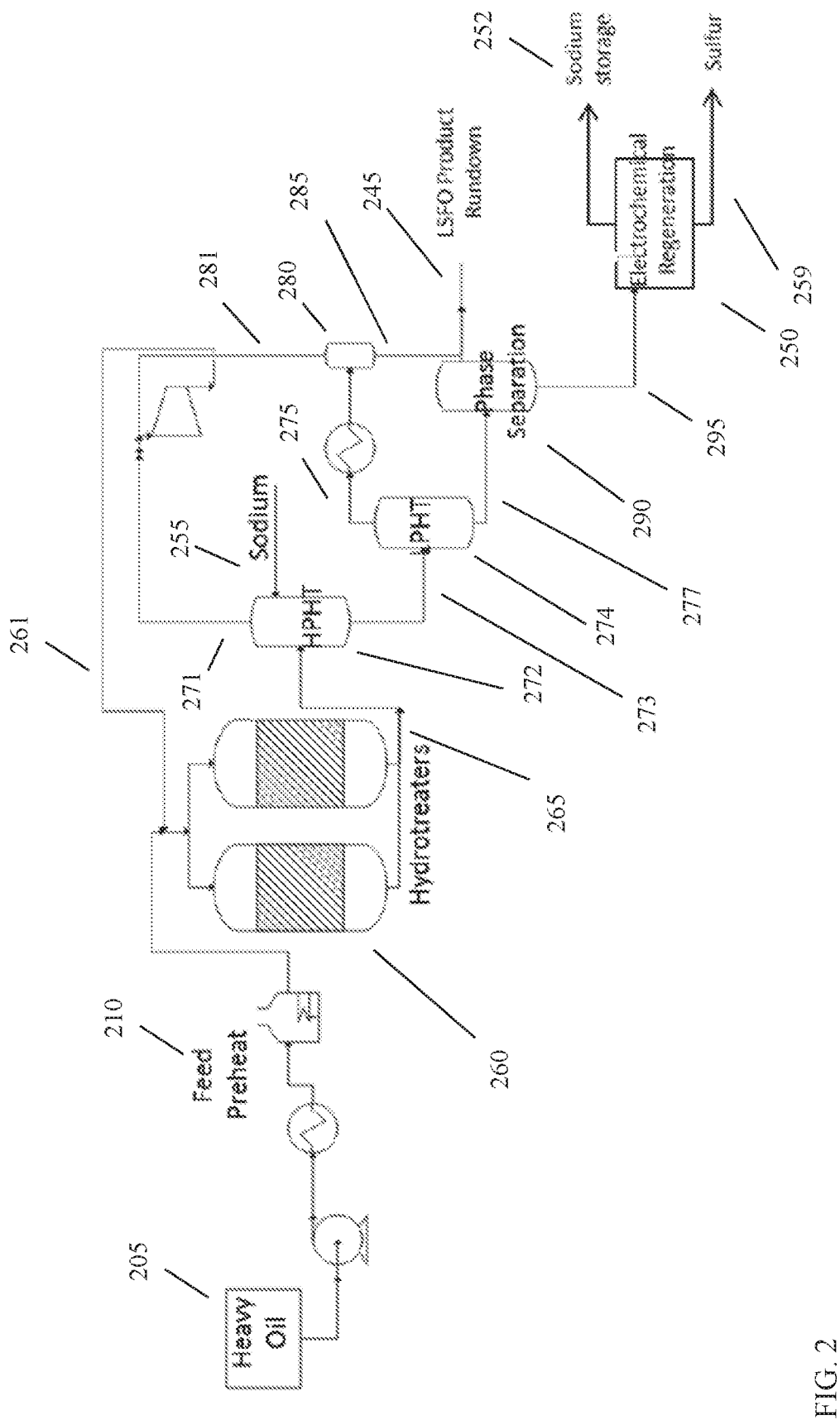
FIG. 2 shows an example of a reaction system for performing trim desulfurization on a converted feed derived from a hydrotreating process.

FIG. 2 shows an example of a configuration for performing trim desulfurization on hydroprocessed resid fractions using alkali metal. In FIG. 2, a feed 205 can correspond to a heavy oil fraction, such as a vacuum resid fraction that optionally can also include a portion of vacuum gas oil. The feed 205 can be heated in a heater or furnace 210 prior to passing the feed into hydroprocessing reactor(s) 260. The example in FIG. 2 shows two hydroprocessing reactors arranged in parallel, but in other aspects any convenient number of reactors arranged in series and/or in parallel can be used. Inside hydroprocessing reactor(s) 260, the heated feed can be exposed to one or more hydroprocessing (such as hydrotreating) catalysts under hydroprocessing conditions. This can optionally include at least one demetallization catalyst. This can produce a hydroprocessed effluent stream 265.

The hydroprocessed effluent stream 265 can be passed into a series of separators. A first high pressure, high temperature separator 272 can be used to separate a portion of the gas phase products 271 in the hydroprocessed effluent stream from a liquid portion of the hydroprocessed effluent stream 265. Sodium 255 can also be introduced into high pressure, high temperature separator 272 to convert a portion of the organic sulfur in the hydroprocessed effluent stream 265 into sodium sulfide. In some aspects, the hydrogen sulfide for conversion of sodium sulfide into sodium hydrosulfide can correspond to hydrogen sulfide that is part of the hydroprocessed effluent stream 265. The gas phase products 271 can undergo further processing, such as separation (not shown) to recover hydrogen for use as recycled hydrogen 261 for the hydroprocessing reactor(s) 260. The higher boiling portion 273, which includes the sodium sulfide and/or sodium hydrosulfide, can then be passed into low pressure, high temperature separator 274. Passing through a valve into a reduce pressure zone can assist with mixing the sodium with the liquid hydrocarbon. Optionally, additional hydrogen sulfide (not shown) can be added to low pressure, high temperature separator 274 to convert any newly formed sodium sulfide to sodium hydrosulfide. In low pressure, high temperature separator 274, the lower boiling portion 275 can include a distillate and/or gas oil boiling range fraction 285 suitable for separation 280 and inclusion in a low sulfur fuel oil product 245. The other portion generated in separator 280 can correspond to a light ends and naphtha portion 281. The higher boiling portion 277 can include the sodium sulfide and/or sodium hydrosulfide. The higher boiling portion 277 can then be passed into a phase separator 290 for separation of the molten sodium hydrosulfide phase 295 from the remaining portion of the low sulfur fuel oil product 245. The molten sodium hydrosulfide phase 295 can then be passed into electrochemical regeneration stage 250 for recovery of sodium 252. The sulfur 259 generated in electrochemical regeneration stage 250 can be processed in any convenient manner, such as processing in a Claus plant. The net fuel oil product 245 can have a sulfur content of about 0.1 wt % to about 1.0 wt %, or about 0.1 wt % to about 0.5 wt %, or about 0.05 wt % (~500 wppm) to about 1.0 wt %, or about 0.05 wt % (~500 wppm) to about 0.5 wt %, or about 0.05 wt % to 0.1 wt %.

In the configuration shown in FIG. 2, the inlet for the high pressure, high temperature separator 272 is shown as being in direct fluid communication with the outlet(s) of the hydroprocessing reactor(s) 260. The inlet for the low pressure, high temperature separator 274 is shown as being in direct fluid communication with the outlet of the high pressure, high temperature separator 272. The inlet of the electrochemical regeneration stage 250 is shown as being in direct fluid communication with the outlet of low pressure, high temperature separator 274. By contrast, the fluid communication between the outlet(s) of hydroprocessing reactor(s) 260 and low temperature, low pressure separator 274 or electrochemical regeneration stage 250 is shown as indirect fluid communication in FIG. 2.

Configuration Example-Upgrading of FCC Product Fractions

FCC cycle oil fractions, such as light cycle oil fractions or heavy cycle oil fractions, are examples of suitable feeds for trim desulfurization using alkali metal. Optionally, FCC bottoms (also referred to as catalytic slurry oil) fractions can also be suitable for such trim desulfurization. Fluid catalytic cracking (i.e., processing in a fluid catalytic cracker) provides an example of a suitable prior process that can remove transition metals from a feed prior to the trim desulfurization. In particular, transition metals in a feed to a FCC process can deposit on the FCC catalyst. Additionally or alternatively, the metals content of feeds to an FCC process can often be reduced or minimized to extend the run length for an FCC process.

Conventionally, cycles oils can potentially be severely hydrotreated to allow at least light cycle oil fractions to be blended with the diesel fuel pool. However, if hydrogen is limited at a refinery location, the cycle oil fractions may simply be blended into fuel oil. Trim desulfurization using alkali metal can allow for upgrading of cycle oil fractions while reducing or minimizing required hydrogen.

An example of a suitable reactor for performing an FCC process can be a riser reactor. Within the reactor riser, the FCC feedstream can be contacted with a catalytic cracking catalyst under cracking conditions thereby resulting in spent catalyst particles containing carbon deposited thereon and a lower boiling product stream. The cracking conditions can typically include: temperatures from about 900° F. to about 1060° F. (~482° C. to ~571° C.), or about 950° F. to about 1040° F. (~510° C. to ~560° C.); hydrocarbon partial pressures from about 10 to 50 psia (~70-350 kPa-a), or from about 20 to 40 psia (~140-280 kPa-a); and a catalyst to feed (wt/wt) ratio from about 3 to 8, or about 5 to 6, where the catalyst weight can correspond to total weight of the catalyst composite. Steam may be concurrently introduced with the feed into the reaction zone. The steam may comprise up to about 5 wt % of the feed. In some aspects, the FCC feed residence time in the reaction zone can be less than about 5 seconds, or from about 3 to 5 seconds, or from about 2 to 3 seconds.

Catalysts suitable for use within the FCC reactor herein can be fluid cracking catalysts comprising either a large-pore zeolite or a mixture of at least one large-pore zeolite catalyst and at least one medium-pore zeolite catalyst. In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework. Large-pore zeolites suitable for use herein can be any zeolitic catalyst having an average pore diameter greater than ~0.7 nm which are typically used to catalytically "crack" hydrocarbon feeds. It should be noted that when the cracking catalyst comprises a mixture of at least one large-pore zeolite catalyst and at least one medium-pore zeolite, the large-pore component can typically be used to catalyze the breakdown of primary products from the catalytic cracking reaction into clean products such as naphtha and distillates for fuels and olefins for chemical feedstocks. Zeolitic catalysts for FCC units can correspond to self-bound catalysts and/or catalysts that include a separate inorganic matrix material (i.e., a binder).

Large pore zeolites that are typically used in commercial FCC process units can be suitable for use herein. FCC units used commercially generally employ conventional cracking catalysts which include large-pore zeolites such as USY or REY. Additional large pore zeolites that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L. ZK-4, ZK-5, B, E, F, H, J, M, Q, T, W, Z, alpha and beta, omega, REY and USY zeolites. In some aspects, suitable large-pore zeolites for use herein can be the faujasites, particularly zeolite Y, USY, and REY.

Medium pore zeolites suitable for use in the practice of the present invention are described in "Atlas of Zeolite Structure Types", eds. W. H. Meier and D. H. Olson, Butterworth-Heineman, Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

An input feed for FCC processing can typically correspond to a feed that includes a portion that boils in the lubricant and/or vacuum gas oil boiling range. Optionally, the feed can by hydroprocessed prior to FCC processing. A wide range of petroleum and chemical feedstocks can be suitable (optionally after hydroprocessing) for use as an FCC input feed. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, extracts, slack waxes, Fischer-Tropsch waxes, raffinates, and mixtures of these materials.

Suitable feeds for use as an FCC input feed can include, for example, feeds with an initial boiling point and/or a T5 boiling point and/or T10 boiling point of at least ~600° F. (~316° C.), or at least ~650° F. (~343° C.), or at least ~700° F. (371° C.), or at least ~750° F. (~399° C.). Additionally or alternately, the final boiling point and/or T95 boiling point and/or T90 boiling point of the feed can be ~1100° F. (~593° C.) or less, or 1050° F. (~566° C.) or less, or 1000° F. (~538° C.) or less, or ~950° F. (~510° C.) or less. In particular, a feed can have a T5 boiling point of at least 316° C. and a T95 boiling point of 593° C. or less, or a T5 boiling point of at least 343° C. and T95 boiling point of 566° C. or less, or a T10 boiling point of 343° C. and a T90 boiling point of 566° C. or less. Optionally, it can be possible to use a feed that includes a lower boiling range portion. Such a feed can have an initial boiling point and/or a T5 boiling point and/or T10 boiling point of at least ~350° F. (~177° C.), or at least ~400° F. (~204° C.), or at least ~450° F. (~232° C.). In particular, such a feed can have a T5 boiling point of at least 177° C. and a T95 boiling point of 593° C. or less, or a T5 boiling point of at least 232° C. and a T95 boiling point of 566° C. or less, or a T10 boiling point of 177° C. and a T90 boiling point of 566° C. or less.

In some optional aspects, the aromatics content of the FCC input feed can be at least ~20 wt %, or at least ~30 wt %, or at least ~40 wt %, or at least 50 wt %. In particular, the aromatics content can be ~20 wt % to ~70 wt %, or ~30 wt % to ~60 wt %, or ~40 wt % to ~70 wt %. In some optional aspects, the FCC input feed (after any optional hydrotreatment) can have a sulfur content of ~500 wppm to ~40000 wppm, or ~500 wppm to ~20000 wppm, or ~500 wppm to ~5000 wppm.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate boiling range stream corresponding to a light cycle oil, other heavier gas oil product streams that correspond to heavy cycle oils, and a bottoms stream that corresponds to a catalytic slurry oil.

In some aspects, a cycle oil fraction from an FCC process can have a sulfur content of about 1.0 wt % to about 3.0 wt %, or about 0.5 wt % to about 3.0 wt %, or about 1.0 wt % to about 2.0 wt %. For cycle oil fractions with sufficient cetane to be useful for blending into a diesel fuel pool, removing the additional sulfur in a cycle oil fraction to satisfy a sulfur specification for a diesel fuel (such as 15 wppm or less) can be resource intensive relative to the increase in end product value. In this type of situation, using trim alkali metal desulfurization can allow the sulfur content of a cycle oil fraction to be reduced to about 0.05 wt % to about 0.5 wt %, or about 0.1 wt % to about 0.5 wt %, or about 0.05 wt % to about 0.3 wt %. By using alkali metal desulfurization to remove a portion of the sulfur, the subsequent reaction conditions required to meet a low sulfur diesel specification can be less severe and/or can involve lower hydrogen consumption. In other aspects, the goal of using trim alkali metal desulfurization to reduce the sulfur content to the above ranges can be to produce a cycle oil that can satisfy sulfur standards for a low sulfur fuel oil. In still other aspects, the product after trim alkali metal desulfurization can be a desirable blend component for fuel oils, based in part on the low sulfur content, high aromaticity, and/or low viscosity. The low sulfur content can be beneficial for blending down the total sulfur of a fuel oil. The high aromaticity can be beneficial for improving the ability of a fuel oil to maintain various components in solution. Additionally, the high aromaticity can tend to correspond to having a lower API gravity, which can be balanced against the higher density of some fuel oil blend stocks. The low viscosity can be beneficial for blending down the viscosity of other viscous feed stocks.

Performing trim alkali metal desulfurization on a cycle oil fraction can potentially also provide benefits related to the hydrogen content and/or the API gravity of the cycle. In some aspects, a trim desulfurized product based on a cycle oil can have an API gravity that is at least 2 greater than the API gravity of the cycle oil feed, or at least 4 greater, such as up to 8 greater or more. Additionally or alternately, a trim desulfurized product based on a cycle oil can have an hydrogen content that is at 0.2 wt % greater than the hydrogen content of the cycle oil feed to trim desulfurization, or at least 0.5 wt % greater, such as up to 1.0 wt % greater or more.

Figure 3:
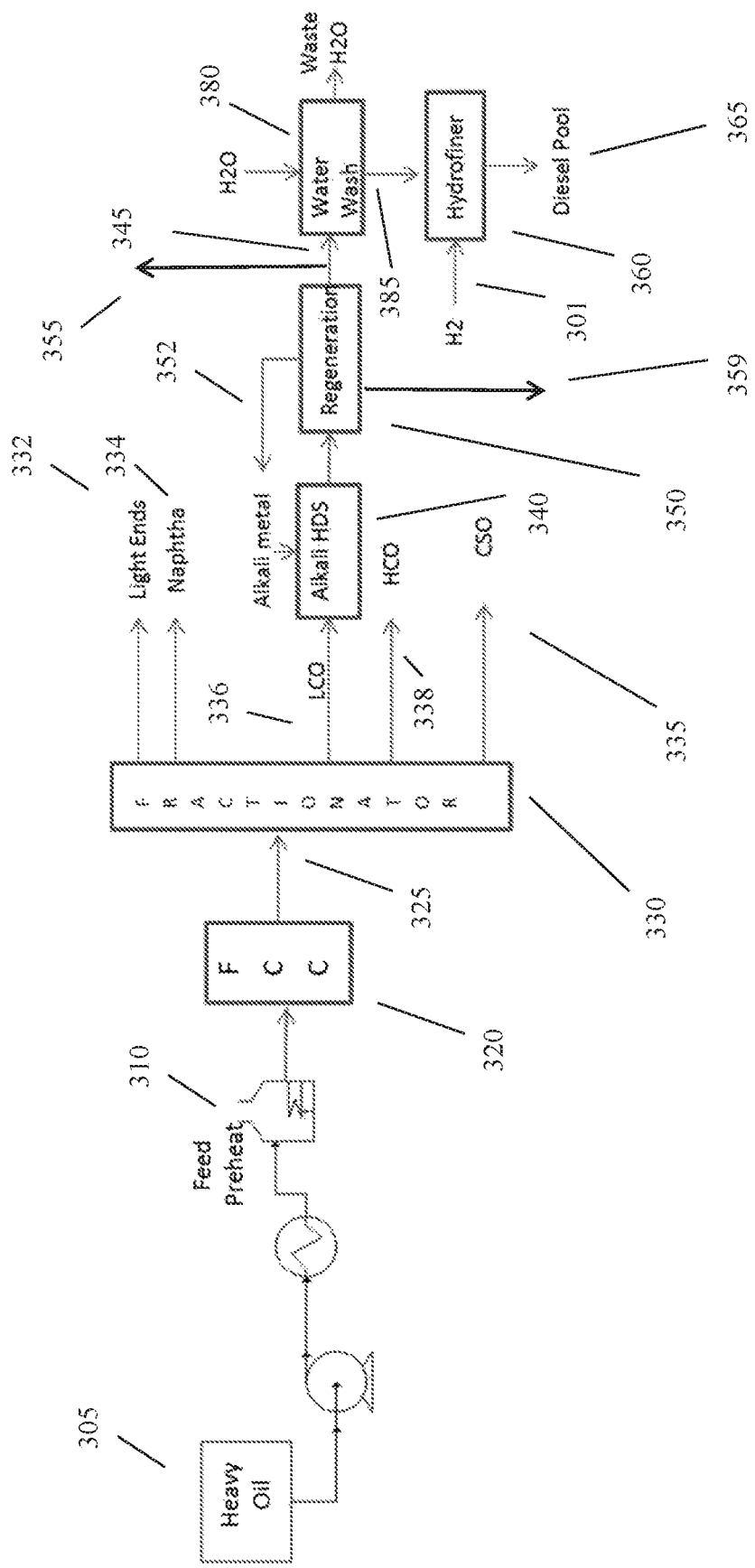
FIG. 3 shows an example of a reaction system for performing trim desulfurization on a converted feed derived from a fluid catalytic cracking process.

FIG. 3 shows an example of a configuration for performing trim desulfurization on a cycle oil fraction using alkali metal. In the example shown in FIG. 3, the cycle oil for processing by trim desulfurization corresponds to light cycle oil 336, but it is understood that any cycle oil, such as heavy cycle oil 338 (or potentially even catalytic slurry oil 335) could be processed by trim desulfurization.

In FIG. 3, a feed 305 can correspond to a feed suitable for FCC processing. The feed 305 can be heated in a heater or furnace 310 prior to passing the feed into fluid catalytic cracker 320 to produce cracked product stream 325. The cracked product stream 325 can be fractionated in a fractionator 330 to form a plurality of products. Although a single fractionator 330 is shown, it is understood that fractionator 330 can alternatively correspond to a plurality of fractionation/separation stages for performing a fractionation. The products from fractionator 330 can include, for example, one or more light ends fractions 132, one or more naphtha boiling range fractions 334, one or more light cycle oil fractions 336, one or more heavy cycle oil fractions 338, and a bottoms or catalytic slurry oil fraction 335.

In the configuration shown in FIG. 3, trim alkali metal desulfurization is performed on light cycle oil fraction 336. More generally, in other aspects trim alkali metal desulfurization can be performed on light cycle oil fraction(s) 336, heavy cycle oil fraction(s) 338, and/or catalytic slurry oil 335. The cycle oil fraction for processing by alkali metal desulfurization (in FIG. 3, corresponding to light cycle oil fraction 335) can be passed into a desulfurization reactor 340 for contact with alkali metal, such as sodium. The alkali metal can be provided to desulfurization reactor 340 in part as a recycle stream 352 of recycled alkali metal. In the configuration shown in FIG. 3, the desulfurization reactor 140 can schematically represent both the contacting of the light cycle oil 336 with alkali metal and the subsequent exposure of the light cycle oil/alkali metal mixture to $H_2S$ to form alkali metal hydrosulfides. The reaction products from desulfurization reactor 340 can then be passed into regeneration reactor 350 for contact with alkali metal polysulfides. This can allow for regeneration of sodium for recycle 352 while also providing a desulfurized cycle oil product 345 with reduced sulfur content. The excess elemental sulfur 359 generated during the regeneration process can be handled in any convenient manner, such as by processing in a Claus plant. In some aspects, at least a portion of desulfurized cycle oil product 345, and up to potentially all of desulfurized cycle oil product 345, can be withdrawn at this point as a potential (low sulfur) fuel oil product 355. The fuel oil product 355 (and therefore the corresponding desulfurized cycle oil product 345) can have a sulfur content of about 0.1 wt % to about 1.0 wt %, or about 0.1 wt % to about 0.5 wt %, or about 0.05 wt % (~500 wppm) to about 1.0 wt %, or about 0.05 wt % (~500 wppm) to about 0.5 wt %, or about 0.05 wt % to 0.1 wt %.

In the example shown in FIG. 3, at least a portion of desulfurized cycle oil product 345 can be further processed to form a low sulfur diesel or diesel blending product. The at least a portion of desulfurized cycle oil product 345 can be optionally passed into a water wash 380 to remove any excess sodium from a washed desulfurized cycle oil product 385. The washed desulfurized cycle oil product 385 can then be passed into a hydroprocessing reactor 360 (along with a hydrogen-containing gas 301) to produce a hydrotreated effluent 365 that is suitable for use as a diesel fuel or diesel fuel blending product, such as an effluent having a sulfur content of about 50 wppm or less, or about 15 wppm or less.

Additional Embodiments

Embodiment 1

A method for desulfurizing a feedstock, comprising: exposing a feedstock to conversion conditions to form a conversion effluent; separating the conversion effluent to form at least a first converted fraction comprising at least 30 wt % aromatics (or at least 40 wt %, or at least 50 wt %), a sulfur content of 0.5 wt % to 3.5 wt %, a content of Ni, V, and Fe of 10 wppm or less (or 3 wppm or less), and a T5 distillation point of at least 230° C. (or at least 300° C., or at least 350° C.); contacting at least a portion of the first converted fraction with alkali metal in the presence of $H_2$-containing gas to form a converted mixture comprising alkali metal salt, the converted mixture comprising a molar ratio of alkali metal to sulfur of 0.5 to 5.0; separating the converted mixture to form a desulfurized converted fraction comprising a sulfur content of 0.05 wt % to 0.5 wt % and at least one alkali metal salt-containing fraction comprising at least 30 mol % of the alkali metal in the converted mixture (or at least 50 mol %, or at least 70 mol %); and regenerating at least a portion of the alkali metal in the alkali metal salt-containing fraction to elemental alkali metal.

Embodiment 2

The method of Embodiment 1, wherein the alkali metal comprises sodium.

Embodiment 3

The method of any of the above embodiments, wherein the contacting at least a portion of the first converted fraction with alkali metal in the presence of $H_2$-containing gas comprises an $H_2$-containing treat gas rate of about 15 $Nm^3/m^3$ to about 200 $Nm^3/m^3$, or about 25 $Nm^3/m^3$ to about 150 $Nm^3/m^3$, or about 30 $Nm^3/m^3$ to about 120 $Nm^3/m^3$.

Embodiment 4

The method of any of the above embodiments, wherein contacting the first converted fraction with alkali metal comprises contacting the first converted fraction with regenerated alkali metal.

Embodiment 5

The method of any of the above embodiments, wherein contacting the first converted fraction with alkali metal comprises converting less than 30 wt % of the first converted fraction relative to a conversion temperature of 566° C., or less than 20 wt %; or wherein contacting the first converted fraction with alkali metal comprises converting less than 10 wt % of the first converted fraction relative to a conversion temperature of 370° C., or less than 5 wt %; or a combination thereof.

Embodiment 6

The method of any of the above embodiments, wherein the feedstock comprises at least 10 wppm of Ni, V, and Fe, or at least 20 wppm; or wherein the converted mixture comprises a molar ratio of alkali metal to sulfur of 0.5 to 2.0; or a combination thereof.

Embodiment 7

The method of any of the above embodiments, wherein the desulfurized converted fraction comprises a sulfur content of 0.1 wt % to 0.5 wt %, or 0.05 wt % to 0.1 wt %.

Embodiment 8

The method of any of Embodiments 1-7, wherein the conversion effluent comprises a steam cracker tar, a steam cracker gas oil, or a combination thereof, the conversion effluent comprising an API gravity of 5 or less, a hydrogen content of 8.0 wt % or less, or a combination thereof.

Embodiment 9

The method of any of Embodiments 1-7, wherein the conversion effluent comprises a light cycle oil, a heavy cycle oil, a catalytic slurry oil, or a combination thereof, wherein optionally at least a portion of the desulfurized converted fraction is hydrotreated to form a hydrotreated effluent comprising a diesel boiling range fraction having a sulfur content of 50 wppm or less, or 15 wppm or less.

Embodiment 10

The method of any of Embodiments 1-7, wherein the conversion effluent comprises a hydroprocessed effluent, the conversion conditions comprising hydrotreating conditions, demetallization conditions, or a combination thereof in the presence of at least one catalyst having a median pore diameter of at least 100 Angstroms, the hydrotreating conditions optionally comprising conditions effective for conversion of at least 50 wt % of the feedstock relative to 370° C., or at least 60 wt %, wherein optionally the contacting at least a portion of the first converted fraction with alkali metal to form a converted mixture comprising alkali metal salt is performed during the separating the conversion effluent to form the first converted fraction.

Embodiment 11

The method of any of Embodiments 8 to 10, wherein desulfurized converted fraction comprises an API gravity at least 2 greater than an API gravity of the conversion effluent, or at least 4 greater; or wherein the desulfurized converted fraction comprises a hydrogen content at least 0.2 wt % greater than a hydrogen content of the conversion effluent, or at least 0.5 wt % greater; or a combination thereof.

Embodiment 12

The method of any of the above embodiments, wherein regenerating at least a portion of the alkali metal in the alkali metal salt-containing fraction comprises: exposing at least one of the converted mixture and the at least one alkali metal salt-containing fraction to $H_2S$ to convert at least a portion of alkali metal compounds to alkali metal hydrosulfide; converting at least a portion of the alkali metal hydrosulfide to alkali metal polysulfide having a first stoichiometry by mixing the alkali metal hydrosulfide with alkali metal polysulfide having a second stoichiometry; performing electrolysis on the alkali metal polysulfide having the first stoichiometry in the presence of a membrane to form modified alkali metal polysulfide having a third stoichiometry and a membrane permeate comprising alkali metal; and heating at least a portion of the modified alkali metal polysulfide having the third stoichiometry to form sulfur and alkali metal polysulfide having the second stoichiometry, wherein the membrane optionally comprises a NASICON membrane.

Embodiment 13

A system for desulfurization of a conversion effluent, comprising: a conversion reactor comprising a reactor inlet and a reactor outlet; a first gas-liquid separator comprising a first separator inlet in fluid communication with the reactor outlet, a first separator outlet, and an alkali metal inlet in fluid communication with a source of alkali metal; a second gas-liquid separator comprising a second separator inlet in fluid communication with the first separator outlet, and a second separator outlet; a condensed phase separator comprising a condensed phase inlet in fluid communication with the second separator outlet, a first condensed phase outlet, and a second condensed phase outlet; and an alkali metal regeneration stage comprising an alkali metal transport membrane, the alkali metal regeneration stage comprising a regeneration stage inlet in fluid communication with the second condensed phase outlet, a permeate outlet, and a retentate outlet, wherein the alkali metal transport membrane optionally comprises a NASICON membrane Embodiment 14

The system of Embodiment 13, wherein the alkali metal inlet is in fluid communication with the permeate outlet; or wherein the first separator inlet is in direct fluid communication with the reactor outlet; or wherein the second separator inlet is in direct fluid communication with the first separator outlet; or a combination thereof.

Embodiment 15

A desulfurized converted effluent made according to the method of any of Embodiments 1-12.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for desulfurizing a feedstock, comprising:
exposing a feedstock to conversion conditions to form a conversion effluent, wherein the conversion effluent comprises a hydroprocessed effluent, the conversion conditions comprising hydrotreating conditions, demetallization conditions, or a combination thereof in the presence of at least one catalyst having a median pore diameter of at least 100 Angstroms, the hydrotreating conditions optionally comprising conditions effective for conversion of at least 50 wt % of the feedstock relative to 370° C.;
separating the conversion effluent to form at least a first converted fraction comprising at least 30 wt % aromatics, a sulfur content of 0.5 wt % to 3.5 wt %, a content of Ni, V, and Fe of 10 wppm or less, and a T5 distillation point of at least 230° C.;
contacting at least a portion of the first converted fraction with alkali metal in the presence of $H_2$-containing gas to form a converted mixture comprising alkali metal salt, the converted mixture comprising a molar ratio of alkali metal to sulfur of 0.5 to 5.0;
separating the converted mixture to form a desulfurized converted fraction comprising a sulfur content of 0.05 wt % to 0.5 wt % and at least one alkali metal salt-containing fraction comprising at least 50 mol % of the alkali metal in the converted mixture; and
regenerating at least a portion of the alkali metal in the alkali metal salt-containing fraction to elemental alkali metal.

2. The method of claim 1, wherein the alkali metal comprises sodium.

3. The method of claim 1, wherein the contacting at least a portion of the first converted fraction with alkali metal in the presence of $H_2$-containing gas comprises an $H_2$-containing treat gas rate of about 15 $Nm^3/m^3$ to about 200 $Nm^3/m^3$.

4. The method of claim 1, wherein contacting the first converted fraction with alkali metal comprises contacting the first converted fraction with regenerated alkali metal.

5. The method of claim 1, wherein contacting the first converted fraction with alkali metal comprises converting less than 30 wt % of the first converted fraction relative to a conversion temperature of 566° C.; or wherein contacting the first converted fraction with alkali metal comprises converting less than 10 wt % of the first converted fraction relative to a conversion temperature of 370° C.; or a combination thereof.

6. The method of claim 1, wherein the feedstock comprises at least 10 wppm of Ni, V, and Fe.

7. The method of claim 1, wherein the desulfurized converted fraction comprises a sulfur content of 0.1 wt % to 0.5 wt %, or wherein the desulfurized converted fraction comprises a sulfur content of 0.05 wt % to 0.1 wt %.

8. The method of claim 1, wherein the converted mixture comprises a molar ratio of alkali metal to sulfur of 0.5 to 2.0.

9. The method of claim 1, wherein the contacting at least a portion of the first converted fraction with alkali metal to form a converted mixture comprising alkali metal salt is performed during the separating the conversion effluent to form the first converted fraction.

10. The method of claim 1, wherein regenerating at least a portion of the alkali metal in the alkali metal salt-containing fraction comprises:
exposing at least one of the converted mixture and the at least one alkali metal salt-containing fraction to $H_2S$ to convert at least a portion of alkali metal compounds to alkali metal hydrosulfide;
converting at least a portion of the alkali metal hydrosulfide to alkali metal polysulfide having a first stoichiometry by mixing the alkali metal hydrosulfide with alkali metal polysulfide having a second stoichiometry;
performing electrolysis on the alkali metal polysulfide having the first stoichiometry in the presence of a membrane to form modified alkali metal polysulfide having a third stoichiometry and a membrane permeate comprising alkali metal; and heating at least a portion of the modified alkali metal polysulfide having the third stoichiometry to form sulfur and alkali metal polysulfide having the second stoichiometry.

11. The method of claim 10, wherein the membrane comprises a NASICON membrane.

* * * * *